United States Patent

Amirehteshami et al.

(10) Patent No.: US 8,510,952 B2
(45) Date of Patent: Aug. 20, 2013

(54) AGILE MANUFACTURING APPARATUS AND METHOD FOR HIGH THROUGHPUT

(75) Inventors: David Hassan Amirehteshami, Los Alamitos, CA (US); Branko Sarh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 322 days.

(21) Appl. No.: 12/837,252

(22) Filed: Jul. 15, 2010

(65) Prior Publication Data

US 2012/0011693 A1    Jan. 19, 2012

(51) Int. Cl.
- *B21D 53/88* (2006.01)
- *G05B 11/01* (2006.01)
- *G06F 1/04* (2006.01)

(52) U.S. Cl.
USPC .................... 29/897.2; 700/19; 713/375

(58) Field of Classification Search
USPC .......... 29/428, 897.2, 407.09, 700, 701, 29/703, 709, 33 R; 700/19, 2, 3, 9, 20, 56, 700/169, 245, 247–249, 253; 713/375; 901/6, 901/8
See application file for complete search history.

(56) References Cited

U.S. PATENT DOCUMENTS

| | | | |
|---|---|---|---|
| 5,778,505 A | 7/1998 | Mangus et al. | |
| 6,775,897 B2 | 8/2004 | Wolf et al. | |
| 7,024,250 B2 | 4/2006 | Graf et al. | |
| 2006/0182557 A1 | 8/2006 | Frauen et al. | |
| 2009/0249606 A1* | 10/2009 | Diez et al. | 29/428 |

FOREIGN PATENT DOCUMENTS

| | | |
|---|---|---|
| EP | 2116340 A1 | 11/2009 |
| JP | 403168807 * | 7/1991 |
| WO | 2009000761 A2 | 12/2008 |

OTHER PUBLICATIONS

"Solution for Automated Drilling & Lockbolt Installation in Carbon Fiber Structures", SAE AeroTech #2009-01-3214, Engineering, Operations & technology/Boeing Research & Technology, Dec. 2009, 1 page.

PCT Search report dated Oct. 6, 2011 regarding International application No. PCT/US2011/038858 with International filing date of Jun. 2, 2011, 13 pp.

* cited by examiner

*Primary Examiner* — John C Hong
(74) *Attorney, Agent, or Firm* — Yee & Associates, P.C.

(57) ABSTRACT

A method, apparatus and computer program product are present for performing a manufacturing procedure. A component may be positioned in a work area. A plurality of groups of robots may be operated in parallel and robots of each group of robots of the plurality of groups of robots may be operated in synchronism for performing a plurality of manufacturing operations at a plurality of locations on the component.

33 Claims, 10 Drawing Sheets

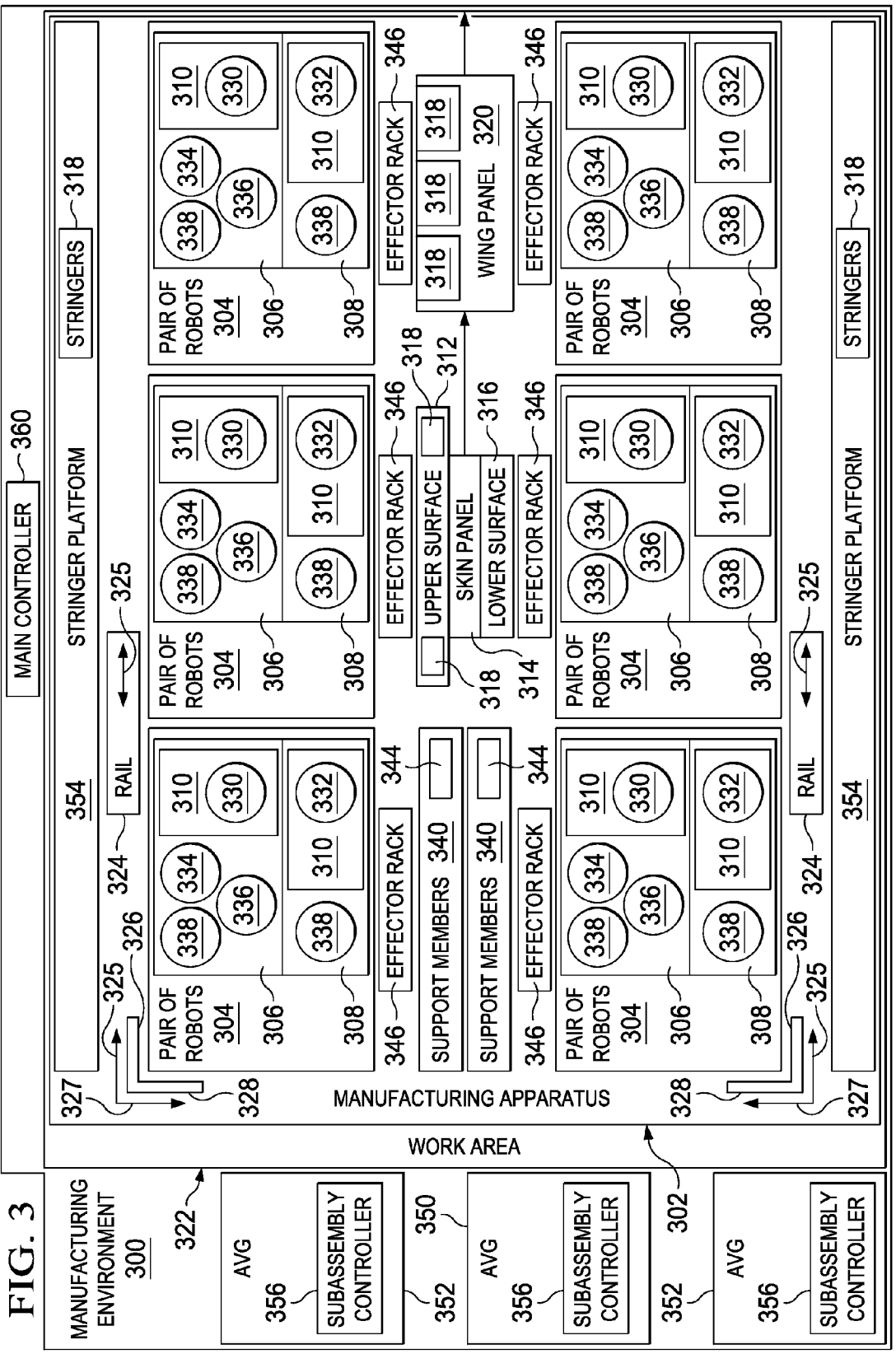

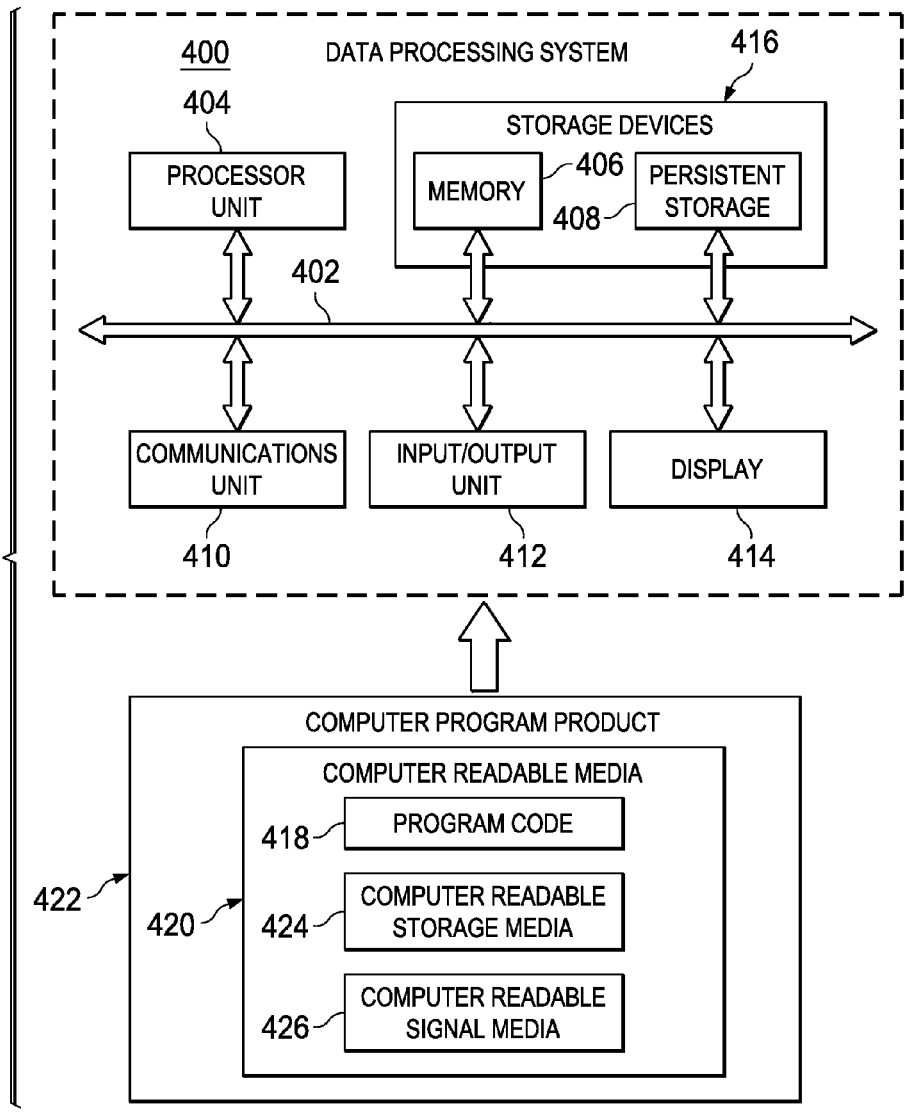
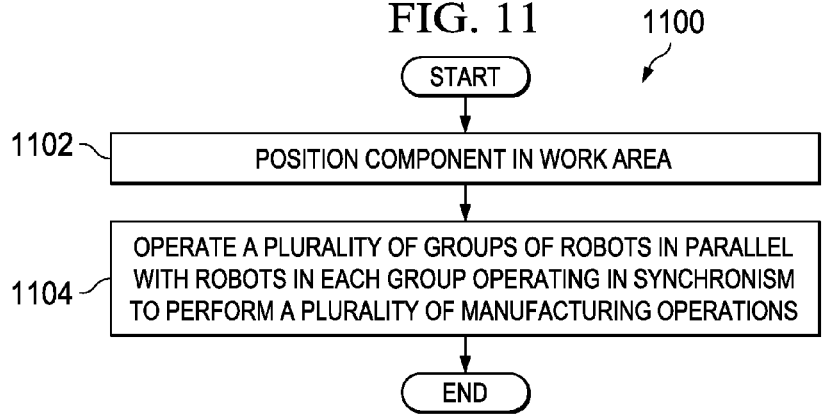

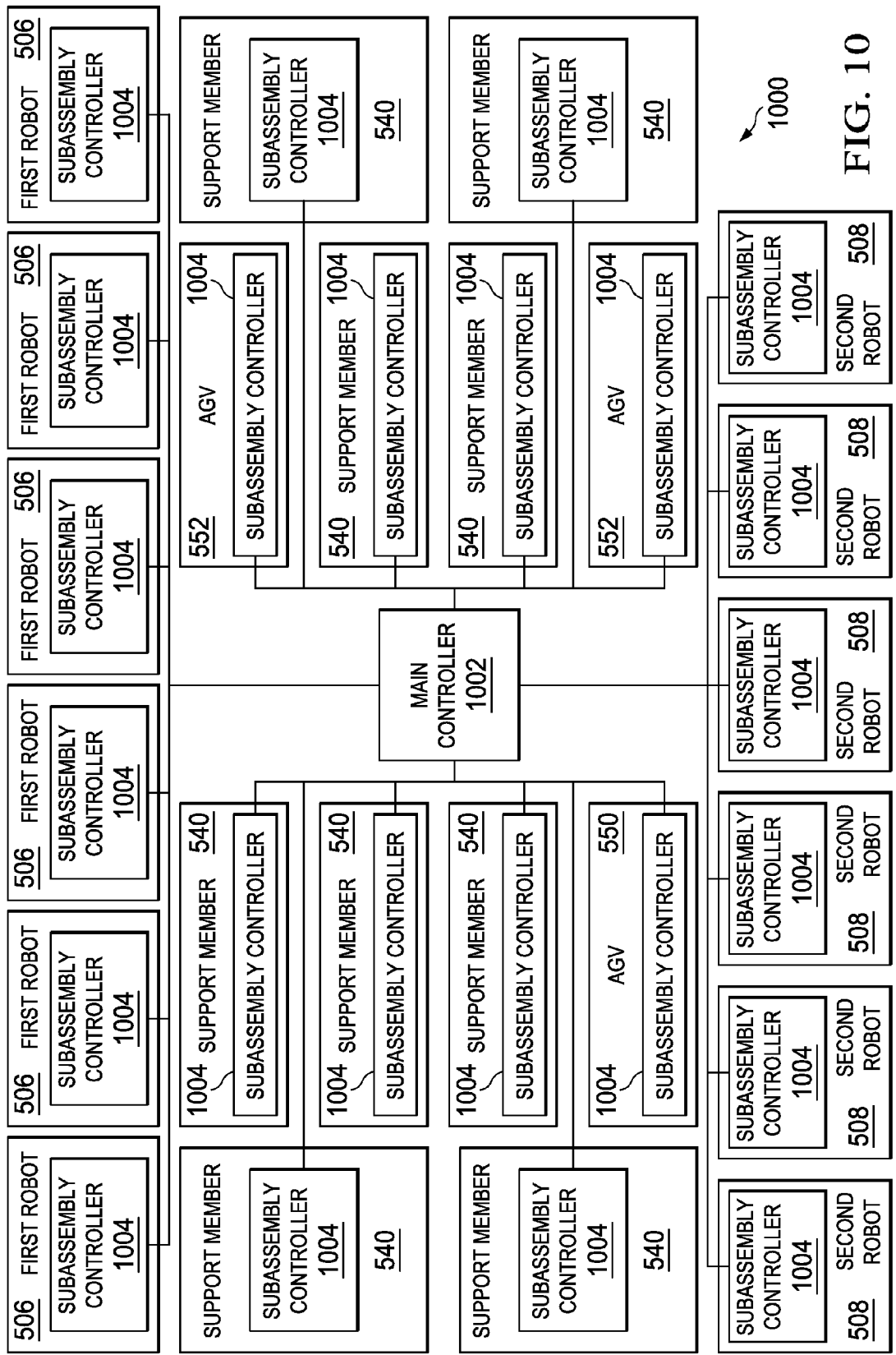

AGILE MANUFACTURING APPARATUS AND METHOD FOR HIGH THROUGHPUT

BACKGROUND INFORMATION

1. Field

The present disclosure relates generally to a manufacturing apparatus and method. More particularly, the present disclosure relates to an apparatus and method for manufacturing wing panels for aircraft and for other applications.

2. Background

Stringers are structural elements which may be attached to skin panels to form wing panels for an aircraft. The stringers provide the wing panels with structural stability and integrity to enable the wing panels to cope with operational loads encountered during flight.

Stringers may be attached to skin panels, for example and without limitation, metallic or composite skin panels, using C-frame machines. C-frame machines, however, are large, bulky structures which are designed to apply relatively large forces and to handle relatively large-sized parts. Current practice may also use FAJ (Floor Assembly Jig) tooling to temporarily locate and tack stringers to skin panels. FAJ tooling, however, is also large and bulky and does not lend itself to agile manufacturing concepts.

In addition, throughput may be severely limited when using C-frame machines to manufacture wing panels because the machines are able to drill and fasten only one hole at a time. Inasmuch as twenty or more stringers may be attached to a single skin panel, the manufacturing process may have less than desirable efficiency.

Therefore, it would be advantageous to have an apparatus and method for manufacturing wing panels for aircraft and for other applications that takes into account one or more of the issues discussed above as well as possibly other issues.

SUMMARY

In one advantageous embodiment, a manufacturing method is present. A component may be positioned in a work area. A plurality of groups of robots may be operated in parallel and robots of each group of robots of the plurality of groups of robots may be operated in synchronism for performing a plurality of manufacturing operations at a plurality of locations on the component.

In another advantageous embodiment, a method for manufacturing a wing panel of an aircraft is present. A skin panel may be positioned in a work area. A support structure may be positioned on a surface of the skin panel. A plurality of groups of robots may be operated in parallel for attaching the support structure to the skin panel at a plurality of locations, and robots of each group of robots of the plurality of groups of robots may be operated in synchronism for attaching the support structure to the skin panel at a location of the plurality of locations.

In yet another advantageous embodiment an apparatus may be present. The apparatus may have a plurality of groups of robots. The apparatus may also have at least one controller for controlling the plurality of groups of robots to operate in parallel and for controlling robots of each group of robots of the plurality of groups of robots to operate in synchronism for performing a plurality of manufacturing operations at a plurality of locations on a component.

In yet another advantageous embodiment, a computer program product may be present. The computer program product may have a computer usable storage medium having instructions for performing a manufacturing process. The computer program product may also have instructions for positioning a component in a work area. The computer program product may also have instructions for operating a plurality of groups of robots in parallel and for operating robots of each group of robots of the plurality of groups of robots in synchronism for performing a plurality of manufacturing operations at a plurality of locations on the component.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 3 is an illustration of a manufacturing environment in accordance with an advantageous embodiment;

FIG. 4 is an illustration of a data processing system in accordance with an advantageous embodiment;

FIG. 10 is an illustration of a diagram depicting a control system for controlling the manufacturing apparatus of FIG. 5 in accordance with an advantageous embodiment;

FIG. 11 is an illustration of a flowchart depicting a process for performing a manufacturing operation in accordance with an advantageous embodiment.

DETAILED DESCRIPTION

Figure 1:
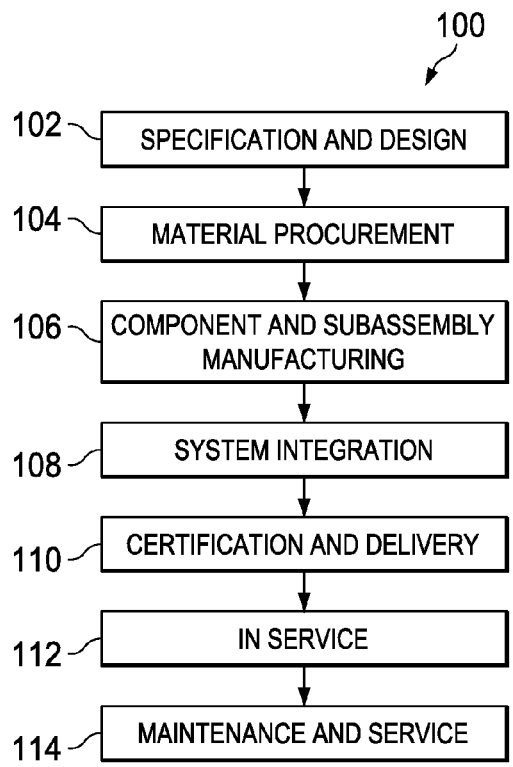
FIG. 1 is an illustration of an aircraft manufacturing and service method in accordance with an advantageous embodiment.
Figure 2:
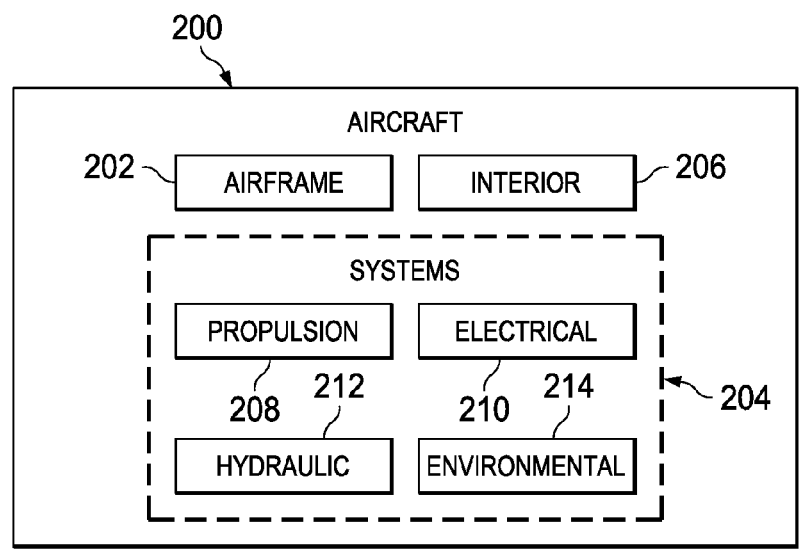
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

With reference now to FIG. 3, an illustration of a manufacturing environment is depicted in accordance with an advantageous embodiment. In this advantageous embodiment, the manufacturing environment is designated by reference number 300, and may have a manufacturing apparatus 302 that may be used to perform a manufacturing process, for example and without limitation, a manufacturing process to manufacture wing panels for aircraft.

Manufacturing apparatus 302 may have a plurality of groups of robots, for example and without limitation, a plurality of pairs of robots 304. Each pair of robots 304 may have a first robot 306 and a second robot 308. First robot 306 of each pair of robots 304 may be of articulated type and may handle a plurality of end effectors 310, for example and without limitation, a plurality of Multi-Function End Effectors (MFEEs) having integrated modules for performing various manufacturing operations of a manufacturing process. Second robot 308 of each pair of robots 304 may be of hexapod type and also may handle a plurality of end effectors 310, for example and without limitation, a plurality of MFEEs.

First robot 306 of each pair of robots 304 may perform a plurality of manufacturing operations on the upper surface 312 of a component 314, and second robot 308 of each pair of robots 304 may perform a plurality of manufacturing operations on the lower surface 316 of component 314. For example and without limitation, component 314 may be a skin panel, and the plurality of manufacturing operations may be a plurality of manufacturing operations to attach a plurality of stringers 318 or another support structure, for example and without limitation, a frame, a rib or a clip, to the upper surface 312 of skin panel 314 to manufacture a wing panel 320 for an aircraft.

Manufacturing apparatus 302 may be positioned in a work area 322. The first robot 306 of each pair of robots 304 may be moveable in the X-direction 325 within work area 322 along rails 324, and the second robot 308 of each pair of robots 304 may be moveable in both the X-direction 325 and the Y-direction 327 along rails 326 and 328, respectively. The plurality of pairs of robots 304 may be operated in parallel for attaching the plurality of stringers 318 to the upper surface 312 of skin panel 314 at a plurality of locations to form wing panel 320, and the first robot 306 and the second robot 308 of each pair of robots 304 may operate in synchronism to attach a stringer to the skin panel at one of the plurality of locations.

An MFEE 310 of each first robot 306 may have a built-in block 330 of steel or another material, and an MFEE 310 of each second robot 308 may have a built-in electromagnet 332 to provide electromagnetic clamping during various of the manufacturing operations. Each first robot 306 may also have a vision system 334 and various sensors 336 to perform parts inspections. Each of the first and second robots 306 and 308 may also have a subassembly controller 338 for controlling the operation of the respective robots.

Manufacturing apparatus 302 may also have a plurality of support members 340 for supporting and stabilizing skin panel 314 during a manufacturing process. For example and without limitation, support members 340 may be telescoping support members, also sometimes referred to herein as "pogos." Each support member 340 may have a subassembly controller 344 for controlling the operation of the support members.

Manufacturing apparatus 302 may also have a plurality of effector racks 346 on which end effectors may be placed so as to be easily picked-up and/or exchanged by first robots 306 and second robots 308 as required to complete the manufacturing process. Each effector rack 346 may be positioned adjacent a robot.

Manufacturing apparatus 302 may also have a plurality of Automated Guided Vehicles (AGVs). One AGV 350 may be operated to move a skin panel 314 into position in the work area 322, and to transfer a wing panel 320 out of the work area 322 to a next station (not shown) following manufacture of the wing panel 320. Other AGVs 352 may be provided for moving a pair of stringer platforms 354, each stringer platform 354 carrying a supply of stringers 318 into position in the work area 322 to be picked up and positioned on the upper surface 312 of skin panel 314 by first robots 306 and to be assembled to skin panel 314 to form a wing panel 320 by the pairs of robots 304. Each AGV 350 and 352 may have a subassembly controller 356 for controlling the operation of the AGVs 350 and 352.

Manufacturing environment 300 may also have a main controller 360 for controlling the operation of the plurality of pairs of robots 304, the support members 340 and the AGVs 350 and 352 in conjunction with their respective subassembly controller 356.

In order to assemble a plurality of stringers 318 to a skin panel 314 to manufacture a wing panel 320, a skin panel 314 may be positioned in the work area 322 and the plurality of pairs of robots 304 may be operated in parallel and the robots 306 and 308 in each pair of robots 304 may be operated in synchronism to perform all manufacturing operations needed to assemble a plurality of stringers 318 to the skin panel 314. Such manufacturing operations may include positioning the stringers onto the skin panel, clamping, drilling/countersinking, applying sealant, hole inspection, cold working, inserting rivets/fasteners, upsetting rivets, inserting sleeves/nuts, part inspection, etc. In general, although the plurality of pairs of robots 304 operates in parallel to perform the various manufacturing operations, it should be understood that different pairs of robots 304 may be involved in different manufacturing operations at any particular time.

Although manufacturing apparatus 302 is described herein as being used to manufacture a wing panel for an aircraft, it should be understood that manufacturing apparatus 302 may used to perform other manufacturing processes on various components. For example and without limitation, manufacturing apparatus 302 may be used to disassemble a wing panel for an aircraft or to assemble a panel to be used in manufacturing a fuselage, control surfaces such as flaps and the like, and empennage structures for an aircraft.

The illustration of the manufacturing apparatus 302 in FIG. 3 is not meant to imply physical or architectural limitations to the manner in which different advantageous embodiments may be implemented. Other components in addition to and/or in place of the ones illustrated may be used. For example, although manufacturing apparatus 302 illustrated in FIG. 3 has six pairs of robots, this is intended to be exemplary only as manufacturing apparatus 302 may have any desired number of groups of robots with each group of robots having any desired number of robots. Some components may be unnecessary in some advantageous embodiments. Also, the blocks are presented to illustrate some functional components. One or more of these blocks may be combined and/or divided into different blocks when implemented in different advantageous embodiments.

Turning now to FIG. 4, an illustration of a data processing system is depicted in accordance with an advantageous embodiment. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Memory 406, in these examples, may be, for example, a random access memory or any other suitable volatile or non-volatile storage device.

Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

Input/output unit 412 allows for the input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code, in the different embodiments, may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422. In one example, computer readable media 420 may be computer readable storage media 424 or computer readable signal media 426.

Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage media in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

Figure 5:
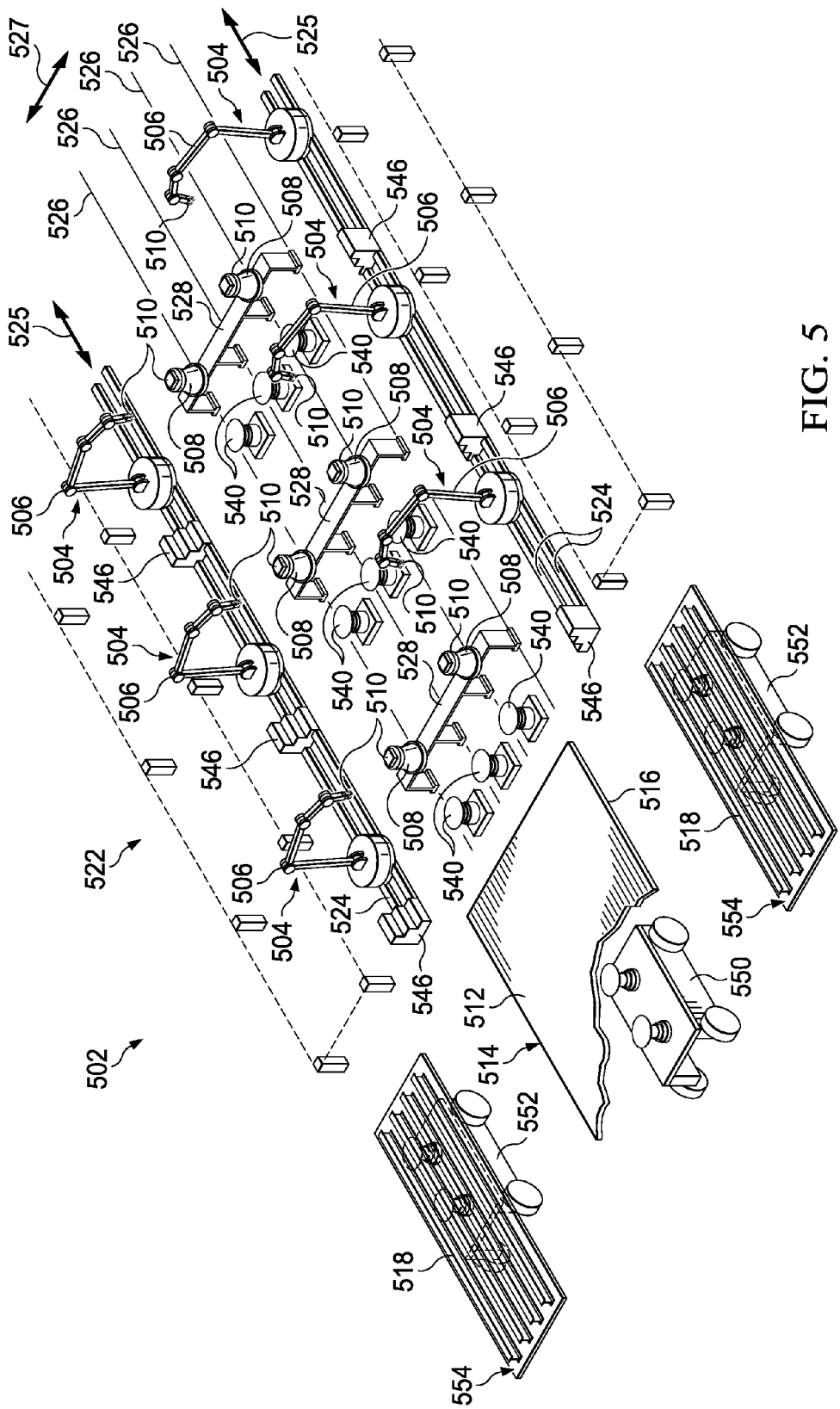
FIG. 5 is an illustration of a perspective view of a manufacturing apparatus in accordance with an advantageous embodiment.

With reference now to FIG. 5, an illustration of a perspective view of a manufacturing apparatus is depicted in accordance with an advantageous embodiment. The manufacturing apparatus is generally designated by reference number 502, and may be implemented as manufacturing apparatus 302 in FIG. 3. FIG. 5 illustrates manufacturing apparatus 502 in a "home" position prior to initiation of a manufacturing process.

Manufacturing apparatus 502 may be an assembly apparatus for assembling a plurality of stringers 518 to a skin panel 514, for example and without limitation, to manufacture a wing panel for an aircraft, and may also be referred to herein as an assembly apparatus. It should be understood, however, that this is intended to be exemplary only. Manufacturing apparatus 502 may also be used to assemble other types of support structures to panels, for example and without limitation, to assemble frames, ribs and clips to panels. In addition, manufacturing apparatus may be used to perform other types of manufacturing processes for components for aircraft and for other applications, for example and without limitation, a disassembly process.

Manufacturing apparatus 502 may be positioned in a work area 522 within which an assembly process may be performed. Manufacturing apparatus 502 may have a plurality of groups of robots, for example and without limitation, a plurality of pairs of robots 504. In the advantageous embodiment illustrated in FIG. 5, six pairs of robots are depicted. This is intended to be exemplary only as manufacturing apparatus may have any desired number of groups of robots, with each group of robots having any desired number of robots.

Each pair of robots 504 may have a first robot 506 and a second robot 508. First robot 506 of each pair of robots 504 may be of articulated type and may handle a plurality of end effectors 510, for example and without limitation, a plurality of Multi-Function End Effectors (MFEEs) having integrated modules for performing various manufacturing operations of a manufacturing process. Second robot 508 of each pair of robots 504 may be of hexapod type and may also handle a plurality of end effectors 510, for example and without limitation, a plurality of MFEEs having integrated modules for performing various manufacturing operations of the manufacturing process.

First robot 506 of each pair of robots 504 may perform a plurality of manufacturing operations on the upper surface 512 of component 514, and second robot 508 of each pair of robots 504 may perform manufacturing operations on the lower surface 516 of component 514. For example and without limitation, component 514 may be a skin panel, and the plurality of manufacturing operations may be to attach a plurality of stringers 518 to the upper surface 512 of skin panel 514 to manufacture a wing panel for an aircraft.

The first robot 506 of each pair of robots 504 may be moveable in the X-direction 525 within work area 522 along rails 524, and the second robot 508 of each pair of robots 504 may be moveable in both the X-direction 525 and the Y-direction 527 along rails 526 and 528, respectively. It should be understood, however, that it is not intended to limit illustrative embodiments to robots that are moveable along rails. For example and without limitation, robots 506 and 508 may also be provided on robotic platforms capable of moving in a number of directions. The plurality of pairs of robots 504 may be operated in parallel for attaching the plurality of stringers 518 to the skin panel 514 at a plurality of locations, and the first robot 506 and the second robot 508 of each pair of robots 504 may operate in synchronism to attach a stringer 518 to the skin panel 514 at least one of the plurality of locations.

Although not shown in FIG. 5, each first robot 506 may also have a vision system and various sensors to perform parts inspections, for example and without limitation, to inspect for hole size, shape, configuration and location. Each of the first and second robots 506 and 508 may also have a subassembly controller for controlling the operation of the robots.

Manufacturing apparatus 502 may also have a plurality of support members 540 for supporting and stabilizing skin panel 514 during a manufacturing process. For example and without limitation, support members 540 may be telescoping support members, also sometimes referred to herein as "pogos." Although not illustrated in FIG. 5, each support member 540 may have a subassembly controller for controlling the operation of the support members.

Manufacturing apparatus 502 may also have a plurality of effector racks 546 on which end effectors may be placed so as to be easily picked-up and/or exchanged by first robots 506 and second robots 508 as required to complete the manufacturing process. Each effector rack 546 may be positioned adjacent a first robot 506 or a second robot 508.

Manufacturing apparatus 502 may also have a plurality of Automated Guided Vehicles (AGVs). One AGV 550 may be operated to move a skin panel 514 into position in the work area 522, and to transfer a wing panel out of the work area 522 to a next station following the manufacturing process. Other AGVs 552 may be provided for moving a pair of platforms 554 each carrying a supply of stringers 518 into position in the work area 522, as shown in dashed line, to be picked up and positioned on the skin panel 514 by first robots 506 and to be assembled to skin panel 514 to manufacture a wing panel by the pairs of robots 504. Each AGV 550 and 552 may have a controller subassembly, not shown in FIG. 5, for controlling the operation of the AGVs.

In order to assemble a plurality of stringers 518 to a skin panel 514 to manufacture a wing panel, a skin panel 514 may be positioned in the work area 522 by AGV 550 and the plurality of support structures 540 may be operated to position and stabilize the skin panel 514. The plurality of pairs of robots 504 may then be operated in parallel and the robots 506 and 508 in each pair of robots may be operated in synchronism to perform manufacturing operations needed to assemble a plurality of stringers 518 to the skin panel 514. The first robot 506 of each pair of robots may perform operations on the top surface 512 of the skin panel 512, and the second robot 508 of each pair of robots may perform operations on the bottom surface 516 of the skin panel 514. Such operations may for example and without limitation, include positioning the stringers onto the skin panel, clamping, drilling/countersinking, applying sealant, hole inspection, cold working, inserting rivets/fasteners, upsetting rivets, inserting sleeves/nuts, part inspection, etc.

Figure 6:
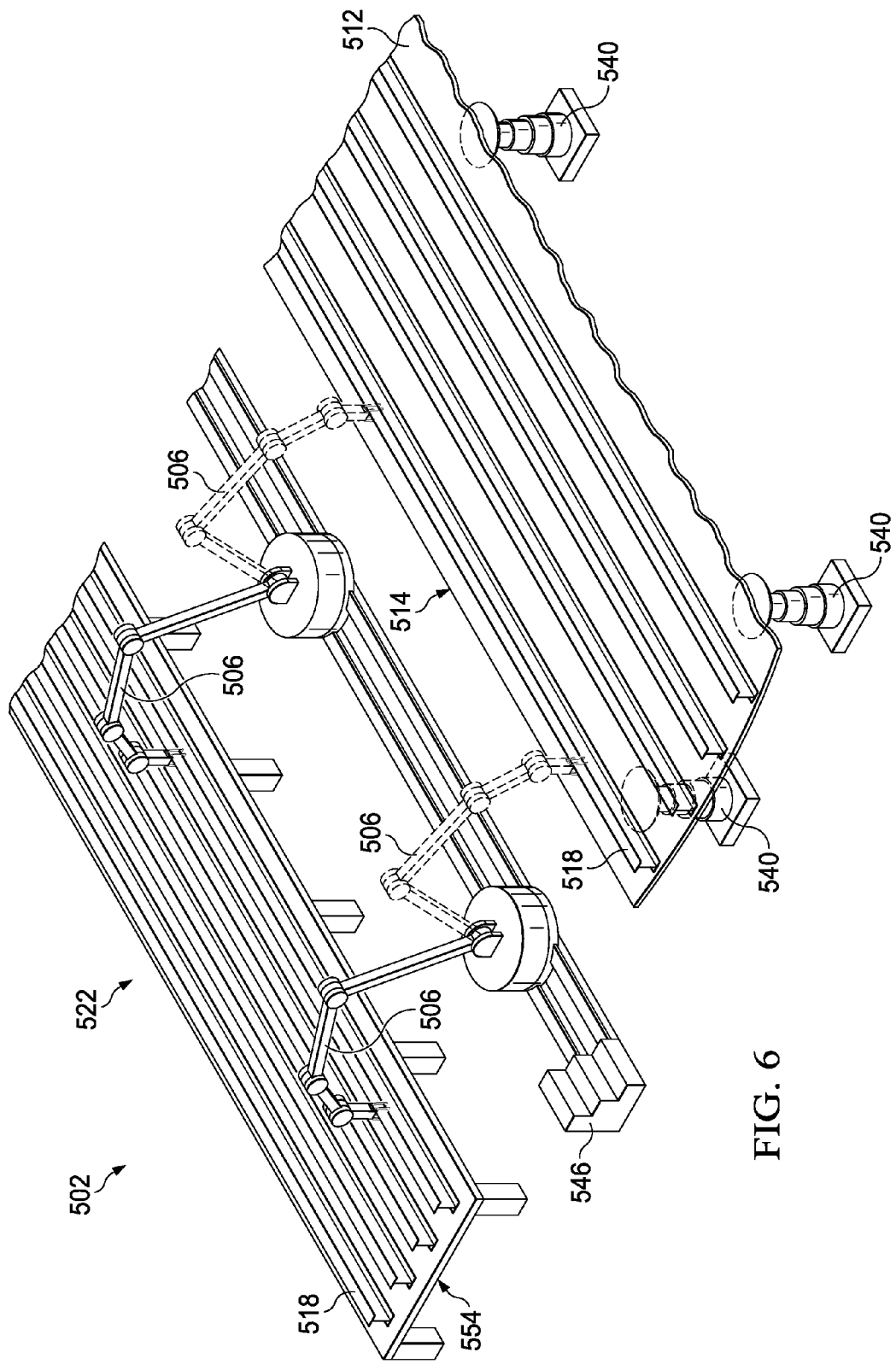
FIG. 6 is an illustration of a perspective view of a portion of the manufacturing apparatus of FIG. 5 depicting a manufacturing operation of the manufacturing apparatus.

With reference now to FIG. 6, an illustration of a perspective view of a portion of the manufacturing apparatus of FIG. 5 is depicted in accordance with an advantageous embodiment. In particular, FIG. 6 illustrates a portion of manufacturing apparatus 502 of FIG. 5 in the process of positioning stringers 518 on the upper surface 512 of skin panel 514. As shown in FIG. 6, both the skin panel 514 and a platform 554 carrying a supply of stringers 518 has been moved into the work area 522 by AGVs 550 and 552, not shown in FIG. 6. The support members 540 have also been operated to properly position and support skin panel 514 for attachment of the stringers 518 to the upper surface 512 of skin panel 514.

As shown in solid line in FIG. 6, each first robot 506 has been operated to pick up a stringer 518 from platform 554; and as shown in dashed line in FIG. 6, after picking up a stringer, each first robot 506 may be operated to position the stringers on the upper surface 512 of the skin panel 514. Although not illustrated in FIG. 6, first robots on the opposite side of skin panel 514 may also be performing stringer pick-up and positioning operations. The movement of the first robots on each side of the work area 522 is coordinated such that the robots will together pick up a stringer 518 and together transfer the stringer 518 to a location on the skin panel 512.

Figure 7:
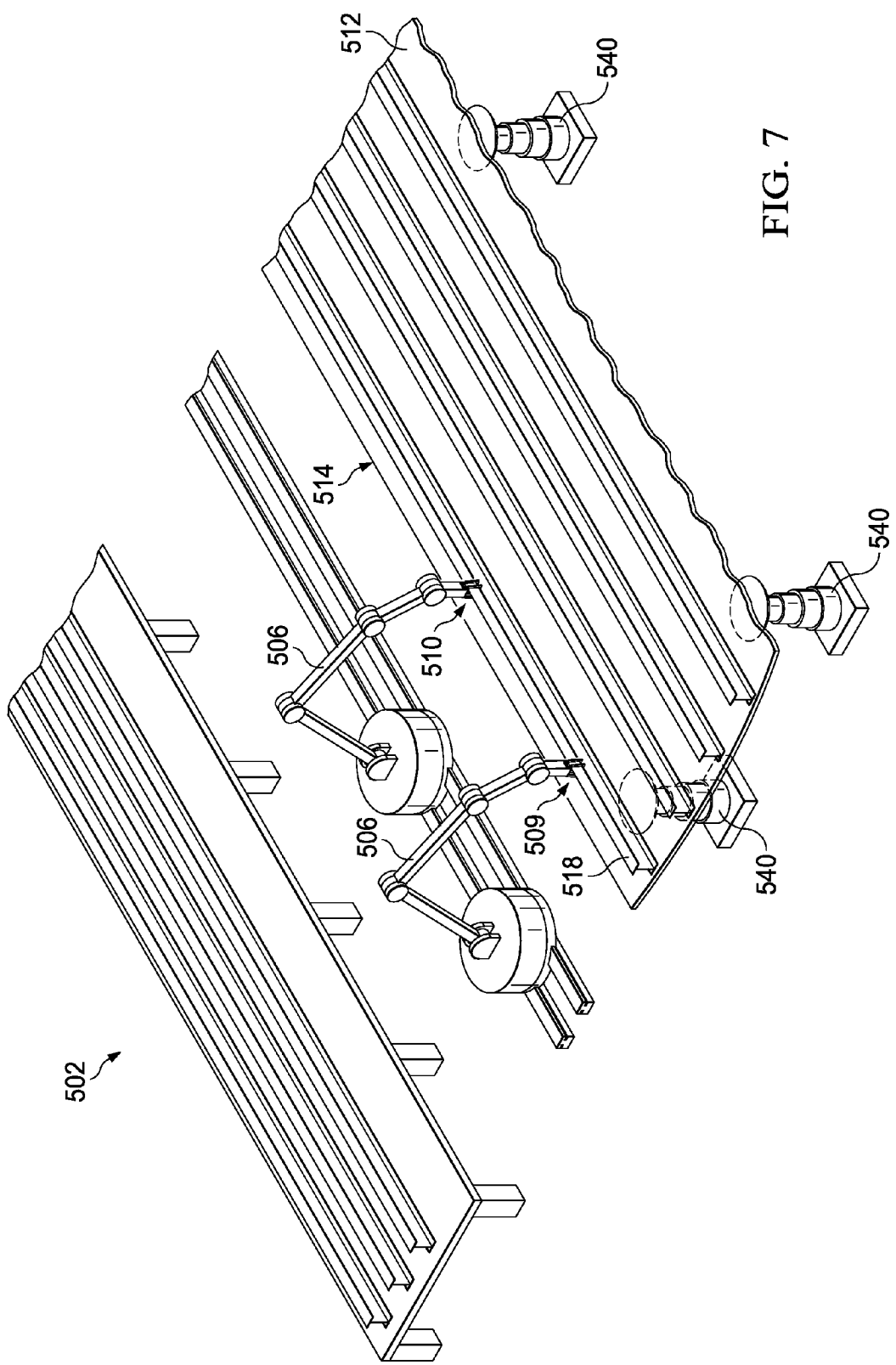
FIG. 7 is an illustration of a perspective view of a portion of the manufacturing apparatus of FIG. 5 depicting a further manufacturing operation of the manufacturing apparatus.

With reference now to FIG. 7, an illustration of a perspective view of a portion of the manufacturing apparatus of FIG. 5 is depicted in accordance with an advantageous embodiment. In particular, FIG. 7 illustrates a portion of manufacturing apparatus 502 in FIG. 5 in the process of locating and aligning a stringer 518 on the upper surface 512 of skin panel 514 and installing tack fasteners that will be used to attach the stringers to the skin panel. One of the first robots 506 may carry a gripper 509 that is used to locate and align a stringer, and a second first robot 506 may carry an MFEE 510 with tack fasteners, not shown in FIG. 7, to install the tack fasteners.

Figure 8:
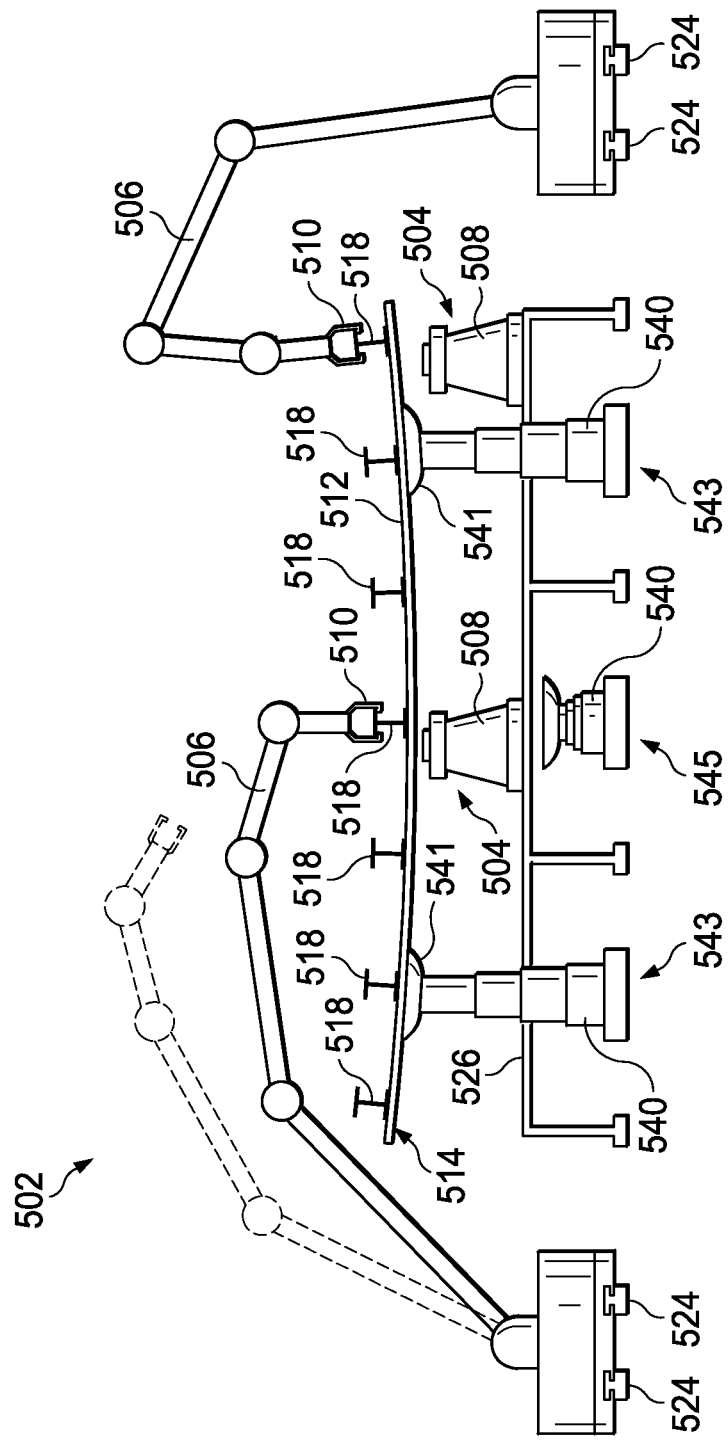
FIG. 8 is an illustration of a side view of a portion of the manufacturing apparatus of FIG. 5 depicting further manufacturing operations of the manufacturing apparatus.

With reference now to FIG. 8, an illustration of a side view of a portion of the manufacturing apparatus of FIG. 5 is depicted in accordance with an advantageous embodiment. In particular, FIG. 8 illustrates a positioning of various components of manufacturing apparatus 502 while performing various manufacturing operations to attach stringers 518 to skin panel 514.

As shown in FIG. 8, the telescopic supporting members (pogos) 540a and 540b have been deployed to properly position and stabilize the skin panel 514. As shown in FIG. 8, the top 541 of each pogo 540 may be pivotally mounted to conform to a curvature of supported skin panel 514. As is also shown in FIG. 8, certain of the pogos 540 may be deployed as shown at 543 and others of the pogos 540 may be retracted as shown at 545 in order to properly position the skin panel 514. In addition, the first robots 506 have been properly positioned by moving them along rails 524, and the second robots 508 have been properly positioned by being moved along rails 526 and 528 (only rail 528 is illustrated in FIG. 8). The appropriate MFEE 510 has also been attached to the robots 506 and 508 from an adjacent MFEE rack (not shown in FIG. 8), and stringers 518 have also been positioned on the upper surface 512 of skin panel 514.

After the stringers 518 have been properly positioned on the upper surface 512 of the skin panel 514, the plurality of pairs of robots 504 may operate in parallel to attach the stringers 518. At the same time, the first and second robots 506 and 508 of each pair of robots 504 may operate in synchronism to perform attachment operations for one of the stringers 518. Such attachment operations may include, for example and without limitation, applying faying sealant, picking and placing the stringers, locating and aligning the stringers, installing tack fasteners, riveting/fastening, cold working, applying bead sealant and performing part inspection.

Figure 9:
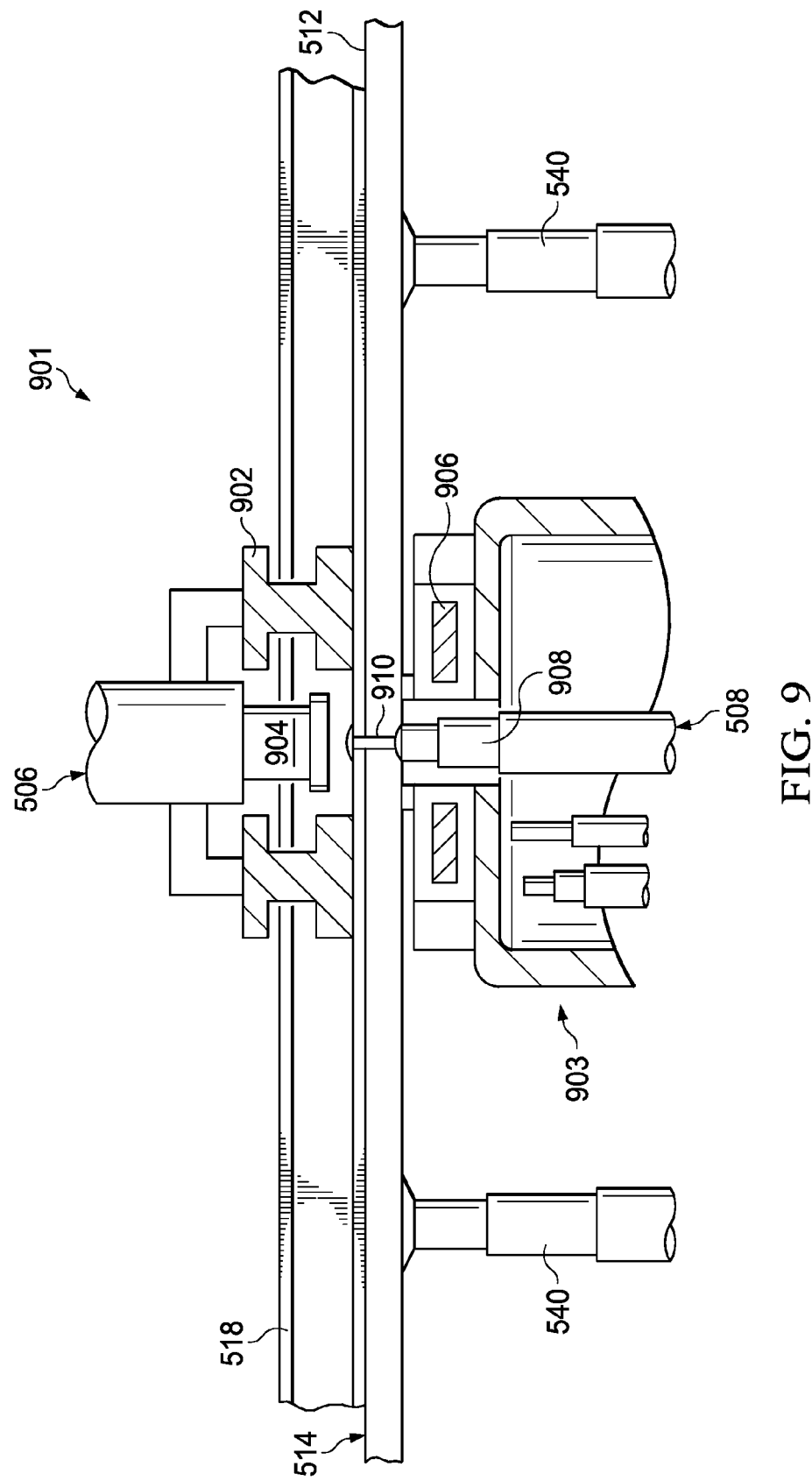
FIG. 9 is an illustration of a side view of a portion of the manufacturing apparatus of FIG. 5 depicting a riveting operation of the manufacturing apparatus.

With reference now to FIG. 9, an illustration of a side view of a portion of the manufacturing apparatus of FIG. 5 is depicted in accordance with an advantageous embodiment. In particular, FIG. 9 illustrates a portion of the manufacturing apparatus 502 of FIG. 5 in the process of installing a rivet/fastener 910 using electromagnetic clamping and an electromagnetic riveting tool (EMR tool).

As shown in FIG. 9, the first robot 506 carries an MFEE 901 that has a steel block 902 and an EMR tool 904, and the second robot 508 carries an MFEE 903 that has an electromagnet 906 and an EMR tool 908. In order to perform a riveting operation, the electromagnet 906 is operated to enable electromagnetic clamping prior to a drilling/riveting process. Once clamped, the MFEE 903 applies the rivet 910, and the EMR tools 904 and 908 work together to squeeze the rivet 910 to lock it in position.

With reference now to FIG. 10, a block diagram of a control system for controlling operation of the manufacturing apparatus of FIG. 5 is depicted in accordance with an advantageous embodiment. As illustrated in FIG. 10, the control system is generally designated by reference number 1000 may have a main controller 1002 for controlling each moveable component of the manufacturing apparatus 502. In addition, each movable component may have its own subassembly controller for controlling operation of its respective component. Thus, as shown in FIG. 10, each first robot 506, each second robot 508, each support member 540, and each AGV 550 and 552 may include a subassembly controller 1004 connected to the main controller 1002 for performing respective manufacturing operations. All necessary programs for the wing panel manufacturing process may be downloaded to the main controller 1002 and the subassembly controller 1004 for each subsystem to permit the wing panel to be manufactured.

With reference now to FIG. 11, an illustration of a flowchart of a process for performing a manufacturing operation is depicted in accordance with an advantageous embodiment. The process illustrated in FIG. 11 may be implemented within environment 300 in FIG. 3. The process is generally designated by reference number 1100 may begin by positioning a component in a work area (operation 1102). A plurality of groups of robots may then be operated in parallel and robots of each group of robots of the plurality of groups of robots may be operated in synchronism to perform a plurality of manufacturing operations at each of a plurality of locations on the component (operation 1104) and the process ends.

Figure 12:
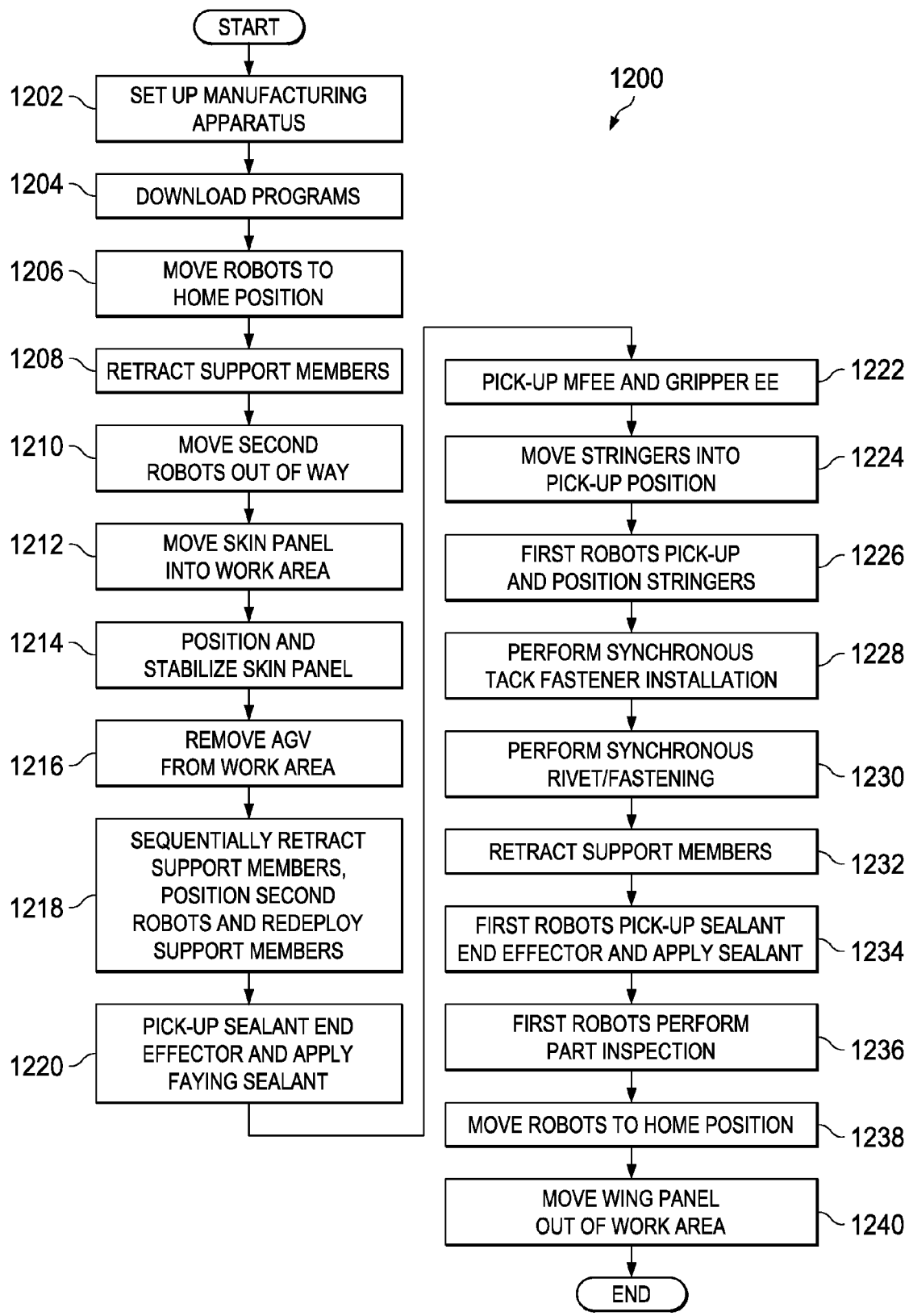
FIG. 12 is an illustration of a flowchart depicting a process for manufacturing a wing panel for an aircraft in accordance with an advantageous embodiment.

With reference now to FIG. 12, an illustration of a flowchart of a process for manufacturing a wing panel for an aircraft is depicted in accordance with an advantageous embodiment. The process illustrated in FIG. 12 may be implemented within environment 300 in FIG. 3.

The process is generally designated by reference number 1200, and may begin by setting-up a manufacturing apparatus to manufacture the wing panel (operation 1202). The setting-up operation may include, for example, providing all necessary tools and MFEEs and positioning the items on MFEE racks, placing stringers on stringer platforms, providing all necessary rivets/fasteners, and the like. All necessary programs for the wing panel manufacturing process may then be downloaded to a main controller for controlling operation of the manufacturing apparatus and to subsystem controllers for controlling each subsystem of the manufacturing apparatus (operation 1204).

All robots of the manufacturing apparatus may then be moved to a home position (operation 1206). For example and without limitation, all first and second robots 506 and 508 may be moved to the positions illustrated in FIG. 5. All support members for supporting a skin panel may then be retracted (operation 1208).

The second robots of each of a plurality of pairs of robots may then be moved to a position away from the support members (operation 1210) so as not to interfere with positioning of a skin panel. Movement may be along X and Y directions, such as along rails 526 and 528 in FIG. 5. A skin panel may then be moved into the work area (operation 1212). In accordance with an advantageous embodiment, the skin panel may be moved into the work area by an AGV, for example and without limitation, AGV 550 illustrated in FIG. 5. The skin panel may then be positioned and stabilized (operation 1214). Positioning and stabilizing may be implemented by operating support members, such as pogos 540 in FIG. 5, as necessary; and following positioning and stabilizing of the skin panel, the AGV is moved out of the work area (operation 1216).

The second robots, equipped with the appropriate MFEEs may then be moved into assembly position (operation 1218). Movement may be along rails 526 and 528 illustrated in FIG. 5. The support members may be sequentially retracted as necessary to enable movement of the second robots into assembly position, and then redeployed (re-extended) following positioning of the second robots. Each first robot may then pick up a sealant end effector and apply faying sealant to the upper surface of the skin panel (operation 1220). The sealant end effector may be picked up from an MFEE rack adjacent to each first robot. Each first robot then exchanges the sealant end effector with another MFEE and a gripper end effector (operation 1222).

Stringers to be attached to the skin panel and previously positioned on stringer platforms may then be moved into pick-up position in the work area (operation 1224). The platforms may be moved into position using AGVs, for example and without limitation, AGVs 552 and 554 illustrated in FIG. 5. First robots on opposite sides of the skin panel may then pick up and position stringers on the upper surface of the skin panel (operation 1226).

The pairs of first and second robots may then perform synchronous tack fastener installation (operation 1228) and synchronous riveting/fastening operations (operation 1230). During performance of the assembly operations, the robots may exchange MFEEs as needed.

The support members are then retracted as needed to allow the second robots to move along the X-axis (operation 1232), the first robots may pick up sealant end effectors and apply sealant beads (operation 1234), and the first robots may perform parts inspection using, for example, a vision system and other sensors thereon (operation 1236).

All robots are then moved into their home position (operation 1238), and the now assembled wing panel may then moved out of the work area to a next station for further processing (operation 1240) and the process ends. The wing panel may be moved to the next station by an AGV such as AGV 550 in FIG. 5.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A manufacturing method comprising;
positioning a component in a work area; and
operating a plurality of groups of robots in parallel and operating robots of each group of robots of the plurality of groups of robots in synchronism for performing a plurality of manufacturing operations at a plurality of locations on the component.

2. The manufacturing method of claim 1, wherein the component comprises a first component, and wherein the plurality of manufacturing operations comprises a plurality of assembly operations for attaching at least one second component to the first component at the plurality of locations.

3. The manufacturing method according to claim 2, wherein the plurality of assembly operations comprises a plurality of fastening operations, and further comprising: clamping at least one second component to the first component during the plurality of fastening operations.

4. The manufacturing method of claim 3, wherein clamping is performed using an electromagnet.

5. The manufacturing method of claim 2 further comprising:
a robot of each group of robots of the plurality of groups of robots together picking up and positioning at least one second component with respect to the first component in a coordinated motion.

6. The manufacturing method of claim 2, wherein the first component comprises a skin panel and at least one second component comprises at least one support structure.

7. The manufacturing method of claim 6, wherein at least one support structure comprises at least one stringer.

8. The manufacturing method of claim 1, wherein the plurality of groups of robots comprises a plurality of pairs of robots.

9. A method for manufacturing a wing panel of an aircraft comprising:
positioning a skin panel in a work area;
positioning a support structure on a first surface of the skin panel; and
operating a plurality of groups of robots in parallel for attaching the support structure to the skin panel at a plurality of locations, and operating robots of each group of robots of the plurality of groups of robots in synchronism for attaching the support structure to the skin panel at a location of the plurality of locations.

10. The method of claim 9, wherein the plurality of groups of robots comprises a plurality of pairs of robots.

11. The method of claim 10, wherein a first robot of each pair of robots of the plurality of pairs of robots performs a first plurality of manufacturing operations on the first surface of the skin panel, and a second robot of each pair of robots of the plurality of pairs of robots performs a second plurality of manufacturing operations on a second surface of the skin panel.

12. The method of claim 11, wherein the first plurality of manufacturing operations and the second plurality of manufacturing operations each comprises at least a plurality of operations of clamping, drilling holes, countersinking holes, applying sealant, hole inspection, cold working, inserting rivets, upsetting rivets, inserting sleeves, inserting nuts and part inspection.

13. The method of claim 11 further comprising:
supporting the skin panel by a plurality of retractable support members; and
positioning the second robots of each of the plurality of pairs of robots, wherein support members of the plurality of retractable support members are sequentially retracted to permit positioning of the second robots of each of the plurality of pairs of robots, and the retracted support members are extended after the positioning of the second robots of each of the plurality of pairs of robots.

14. The method of claim 11 further comprising:
the first robot and the second robot of each of the plurality of pairs of robots clamping the support structure to the skin panel during performing of a fastening operation of the plurality of manufacturing operations.

15. The method of claim 14, wherein clamping is performed using an electromagnet.

16. The method of claim 11, wherein the first robot of each pair of robots comprises an articulated robot, and wherein the second robot of each pair of robots comprises a hexapod robot.

17. The method of claim 9 further comprising:
a first robot of each pair of robots of the plurality of pairs of robots picking up the support structure and positioning the support structure with respect to the skin panel together in a coordinated motion.

18. The method of claim 9, wherein positioning a skin panel in a work area comprises:
moving the skin panel into the work area using an automated guided vehicle.

19. The method of claim 9 further comprising:
moving a plurality of support structures into the work area using at least one automated guided vehicle.

20. The method of claim 9, wherein the support structure comprises a stringer.

21. An apparatus comprising:
a plurality of groups of robots; and
at least one controller for controlling the plurality of groups of robots to operate in parallel and for controlling robots of each group of robots of the plurality of groups of robots to operate in synchronism for performing a plurality of manufacturing operations at a plurality of locations on a component.

22. The apparatus of claim 21, wherein the component comprises a first component, and wherein the plurality of manufacturing operations comprises a plurality of assembly operations for attaching a second component to the first component at the plurality of locations.

23. The apparatus of claim 22, wherein the plurality of groups of robots comprises a plurality of pairs of robots.

24. The apparatus of claim 23, wherein at least one controller controls a first robot of each pair of robots of the plurality of pairs of robots to perform a first plurality of manufacturing operations on a first surface of the first component, and wherein at least one controller controls a second robot of each pair of robots of the plurality of pairs of robots to perform a second plurality of manufacturing operations on a second surface of the first component.

25. The apparatus of claim 24, wherein the first component comprises a skin panel and the second component comprises a support structure.

26. The apparatus of claim 25, wherein the support structure comprises a stringer.

27. The apparatus of claim 25 further comprising:
at least one controller controlling the first robot of each pair of robots of the plurality of pairs of robots to pick up the support structure and to position the support structure with respect to the skin panel together in a coordinated motion.

28. The apparatus of claim 25, wherein the first robot of each pair of robots comprises an articulated robot, and wherein the second robot of each pair of robots comprises a hexapod robot.

29. The apparatus of claim 22 further comprising:
a plurality of retractable support members for supporting the first component, and at least one controller for controlling the plurality of retractable support members for sequentially retracting and extending the plurality of retractable support members.

30. The apparatus of claim 22 further comprising:
at least one automated guided vehicle for moving a plurality of second components into a work area, and at least one controller for controlling at least one automated guided vehicle for moving the plurality of second components into the work area.

31. The apparatus of claim 21 further comprising:
an automated guided vehicle for moving the component into and out of a work area, and at least one controller for controlling the automated guided vehicle for moving the component into and out of the work area.

32. The apparatus of claim 21 further comprising:
a plurality of end effectors for use by the plurality of groups of robots, a number of end effectors comprising a number of electromagnets.

33. A computer program product comprising:
a non-transitory computer usable storage medium having instructions for performing a manufacturing process, the computer program product, comprising:
instructions for positioning a component in a work area; and
instructions for operating a plurality of groups of robots in parallel and for operating robots of each group of robots of the plurality of groups of robots in synchronism for performing a plurality of manufacturing operations at a plurality of locations on the component.

* * * * *